United States Patent [19]
Brent et al.

[11] Patent Number: 5,388,244
[45] Date of Patent: Feb. 7, 1995

[54] CONTROLS FOR INITIAL DIVERSION OF PAGE-FRAME LOGICAL CONTENT AS PART OF DYNAMIC VIRTUAL-TO-REAL TRANSLATION OF A VIRTUAL PAGE ADDRESS

[75] Inventors: Glen A. Brent, Red Hook; Casper A. Scalzi, Poughkeepsie, both of N.Y.

[73] Assignee: International Business Machines Corporation, Armonk, N.Y.

[21] Appl. No.: 946,504

[22] Filed: Sep. 17, 1992

[51] Int. Cl.$^6$ .................. G06F 12/08; G06F 12/14
[52] U.S. Cl. .................. 395/400; 380/4; 395/575
[58] Field of Search .......... 395/400, 425, 575; 364/200 MS File, 900 MS File, DIG. 1, DIG. 2; 380/3, 4

[56] References Cited

U.S. PATENT DOCUMENTS

| | | | |
|---|---|---|---|
| 4,718,008 | 1/1988 | Chang et al. | 395/425 |
| 4,730,249 | 3/1988 | O'Quin, II et al. | 395/700 |
| 5,237,668 | 8/1993 | Blandy et al. | 395/400 |

Primary Examiner—Jack B. Harvey
Assistant Examiner—Jack A. Lane
Attorney, Agent, or Firm—Bernard M. Goldman

[57] ABSTRACT

Logical erasure is done for a virtual page unit of storage in a virtual-page-initialization process (even though the data content of a backing page frame is not physically erased). Pre-initialization controls are associated with each virtual page by a pre-initialization field in each page table entry (PTE). The pre-initialization controls operate differently for fetches and stores within the address translation process. Both fetches and stores test for a pre-initialization state in an F field in the PTE to control if and when any backing page frame can be accessed. While the F field bit is set to its pre-initialization state, no erasure writing is done in any backing page frame for a fetch or full-page store operation. An optional form identifier (form#) field is associated with the pre-initialization state field. The form# field content identifies one of plural form functions or form page frames. Each fetch-only request (occurring prior to a first store to the virtual page) is diverted to a form PF to assure that no prior data in an assigned page frame can be fetched by the user, even though no physical erasure has been done to the contents of any assigned backing page frame. No backing PF needs to be assigned for a fetch-only operation, for which there is no page fault interruption.

18 Claims, 9 Drawing Sheets

CONTROLS FOR INITIAL DIVERSION OF PAGE-FRAME LOGICAL CONTENT AS PART OF DYNAMIC VIRTUAL-TO-REAL TRANSLATION OF A VIRTUAL PAGE ADDRESS

INTRODUCTION

This invention relates to improvements in page frame allocation and initialization for virtual addressing in a computer system using page transfer functions.

BACKGROUND

Processors in computer systems commonly use virtual addressing to read and write data in virtual storage, which is performed by reading and writing data in a backing page frame in real storage. The backing page frame is obtained by a translation of the requested page's virtual address in the user's virtual address space. In the IBM ESA/390 architecture, a virtual address is designed to access data located on a byte boundary in a user's virtual storage, and this byte location is accessed on a byte boundary in a backing page frame. Each ESA/390 page frame is a unit of storage containing 4096 bytes of storage. The backing page frames using byte addressing are located in main storage (MS) on page boundaries, which are at addresses that are multiples of 2**12 bytes of data.

Each virtual page in a virtual address space is managed in the system by a page table entry (PTE), which is an entry in a page table. Each PTE has a field for containing the real address of a backing page frame in the main storage for the represented virtual page. In the IBM ESA/390 architecture, the real address field in the PTE is called a "page frame real address" (PFRA) field. The state of a backing PF flag bit in the PTE (called an "invalid" or a "valid" flag bit) indicates if an associated backing PF is assigned. There may be two backing flag bits to represent if a backing PF is assigned in either of two associated media.

When a processor makes an access request to a virtual page, and the associated flag bit in the PTE indicates no backing page exists, then a page fault occurs which generates a page fault interruption to the operating system (OS). Then, the OS software takes over the processor to assign a page frame, and writes its real address into the PFRA field in the PTE representing the associated virtual address, and sets the associated flag bit to indicate that a backing page frame is assigned to back the virtual page.

The assignment of a backing page to a virtual page by the OS on the occasion of an access to the page is called "demand paging", which is another name for assigning a backing page frame upon the occurrence of a "page fault".

For security reasons upon the assignment of a backing page frame to a virtual page, an erasure process is used to erase the entire content of the newly-assigned page frame as part of its initialization process, so that it does not contain any data from a prior user that could be accessed by a newly assigned user. A newly-assigned user of the page frame is presumed to not have any privileges regarding the data of a prior user of the page frame.

The conventional way this security requirement is enforced in a system is to initialize the page frame by writing zeros (or by replicating some other character) throughout the newly assigned page frame to destroy any prior data which may have been contained therein.

This erasure process of writing 4096 bytes into every newly assigned page frame is a costly process, since page frame assignments are a frequent operation in most mainframe systems. It is conventional for the operating system (OS) software in a computer system to write zeros throughout each page frame being reassigned to erase any old data that may have existed in the reassigned page frame. The erasure may be done when each page frame is made available for reassignment whenever their users no longer need it (such as when a user's processing job is completed and its data is stored on an I/O device), or it may be done later when the page frame is reassigned.

In IBM mainframes using virtual storage, page frame release is done by resetting backing flag bits in the page's PTE to indicate no page frame is assigned to the corresponding virtual page represented by the PTE. A list or queue of available page frames is maintained by an operating system (OS) for use in backing newly referenced virtual pages.

In a prior application Ser. No. 07/424,797 (PO9-89-018), filed Oct. 20, 1989, entitled "Process Using Virtual Addressing In A Non-Privileged Instruction To Control The Copying Of A Page Of Data In Or Between Multiple Media" now U.S. Pat. No. 5,237,668 and assigned to the same assignee as the present invention, the PTE is modified to contain a real address (PFRA) of a backing page frame in either of two different media which use different types of real addressing. The media containing the backing page frame is managed by the state of two flag bits in each PTE for associating any real address in the PFRA with either media, main storage (MS) or expanded storage (ES). Thus, this modified PTE allows the virtual address to have a backing page frame located in either of two different media, MS or ES.

A backing page frame (PF) in any medium may be unassigned by setting the associated flag bit for the medium in the page's PTE to so indicate, which makes the page frame available for reassignment. However, PF unassignment does not affect the data content of the related page frame. Unassignment only breaks the connection between the PF real address of that page frame and the virtual address represented by the PTE.

There is no requirement that a user erase the data content of a page frame before releasing the page frame to allow its reassignment. And there is no requirement that a user erase the data content of a page frame when a page frame is assigned to the user. (It is to be remembered that the PTEs and PFs are transparent to the system users, who only see virtual addresses.) Further, a backing page frame is unassigned when the operating system (OS) moves a virtual page to a different medium, e.g. from MS to ES, which is transparent to the program using the virtual page. Accordingly, the OS services for IBM mainframes have been providing the erase function for PFs when they are reassigned, as part of the PF initialization function, to enable the OS to guarantee that the prior data content of any reassigned page frame is not available to any subsequent user. And any prior user of a PF has been allowed to assume that the content of any PF the user unassigns will be erased by the OS before the PF is can be used again.

Such prior PF erase function required the OS to physically write a character into every character location in the entire space within every reassigned page frame in MS and ES. This required writing zeros (or another character) into every character position in every byte of each 4096 byte PF entity. These writing operations consume significant processor time, and are a cost factor in computer use. This prior art erasure operation occurred during an interruption to OS in association with a page release operation, in which OS performed this essential erasure operation to initialize the page frames prior to their re-assignment, that took system resources and added to the system overhead of the operation.

Prior art on controlling the movement of pages of data between MS and another backing medium includes the following prior USA patent applications, in addition to previously cited application Ser. No. 07/424,797 (PO9-89-018) now U.S. Pat. No. 5,237,668:

A) Ser. No. 07/816,917 filed Jan. 3, 1992 (PO9-90-030) now abandoned, and assigned to the same assignee as the present invention, for a data mover (ADM) instruction which supports virtual addressing in MS for asynchronous page moves between MS and ES.

B) U.S. Pat. No. 4,476,524 to Brown et al, issued Oct. 9, 1984 (PO9-80-009) for a pagein (PI) instruction and a pageout (PO) instruction which support real addressing (but not virtual addressing) in MS for synchronous page moves between MS and ES.

None of the various MVPG, ADM, PI and PO instructions in the prior art applications and patents deal with this page initialization problem, except by OS physical storing throughout each page frame.

Conventional pre-initialization of a virtual page occurs upon the assignment of virtual pages to a program: by the operating system (OS) setting up page tables having page table entries (PTEs) representing respective virtual pages for a program requesting a virtual address space. When the address space (comprising the PTEs) is set up for a program or user, no backing page frames in real storage are assigned to the virtual pages (the PTEs). Page frames are later assigned to the virtual pages by page faults signalled during an address translation process for a virtual page, by testing the state of each page assignment flag bit (e.g. I and V bits) in the PTE and generating a page fault signal if a backing page frame is not indicated to have been previously assigned.

The conventional page fault operation (involving an address translation operation) performs an erasing operation on the entire content of each page frame being reassigned to a virtual page. This assures the security of the prior data in the page frame from its newly assigned program (user).

This invention eliminates the need for the operation of writing all zeros (or any other character) in a backing page frame upon its reassignment to a program or user to maintain the security of prior data in the page frame for all fetch and full-page store operations.

SUMMARY OF THE INVENTION

The subject invention introduces the concept of logical erasure for a virtual page unit of storage, as opposed to the physical erasure done to all backing page frames in the prior art. Logical erasure is provided in the page-initialization process of the subject invention to assure that prior data in any page frame (PF) in real storage (assigned to back a virtual page) is not available on reassignment of that page frame (even though the data content of the page frame has not been physically erased).

With the invention, new page-initialization controls are associated with each virtual page. The new page-initialization controls include a page-initialization field in each page table entry (PTE) associated with each virtual page defined to the system. The page-initialization field is set to a page-initialization state while the virtual page has no assigned backing page frame. The page-initialization state continues after a backing page frame is assigned to the virtual page until a first store request is executed in the backing page frame, at which time the page-initialization state is set off.

The page-initialization control process operates differently for fetches and stores within the address translation process. The novel page-initialization control process for both fetches and stores includes testing the page-initialization state in the page-initialization field in any PTE accessed for the virtual address translation process.

The translation process may find a page-initialization state exists, or does not exist, for a virtual page during its translation process. Compatibility with old programs using prior types of PTEs not supporting any page-initialization state will not find any page-initialization state for any fetch or store operation, and will operate with the presumption that the page-initialization state is off.

The invention also provides novel modifications to the address translation process for both fetch and store requests using virtual addressing. Also, the invention recognizes two different kinds of fetch operations: fetch-only and non-fetch-only. Fetch-only operations include: all fetch requests made between pre-initialization of the virtual page (when its PTE is generated) up to a "first" store request to the virtual page, and all fetch requests made between when a virtual page has no assigned backing page frame (PF) up to its "first" store request with an assignment of a backing PF.

For a virtual page receiving fetch-only requests from a processor program, the invention controls the page faulting process differently than is done in the prior art. The invention needs no real backing page frame to complete a fetch-only request to a virtual page. That is, if a sequence of one or more fetch-only requests are received to a virtual page, the invention eliminates the prior requirement that a page fault occur, because of the recognition that no uniquely assigned backing page frame is needed for the translation process to successfully complete fetch-only requests. The invention avoids issuing a page fault whether or not the fetch-only translation process finds a backing page frame was assigned to the virtual page. And if no backing page frame was previously assigned to the virtual page, none is assigned for fetch-only operations.

If a fetch-only access has an assigned PF, its fetch access is diverted by this invention to a "form" page frame, or to a function simulating an entire "form" page, or simulating any addressed portion of a "form" page. If there is no backing page frame assigned to the virtual page, the fetch-only operation also accesses a form PF. The diversion assures that no prior data in an assigned page frame can be fetched by the user, even though no physical erasure has been done to the contents of the assigned backing page frame. And when no backing PF exists, a fetch-only operation avoids the page fault interruption by instead accessing the form PF.

The page-initialization state remains for the virtual page as long as fetch-only accesses are being requested to it. The page-initialization state ends for a virtual page upon the occurrence of its "first" store request, since a store request requires a real backing page frame. That is, the "first store" request, and each following store request to a virtual page requires a backing page frame in which to perform the store. The "first store" operation sets off the page-initialization state in the virtual page's PTE, because thereafter any prior data in the backing page frame has been destroyed by the store operation, so that the page-initialization state is thereafter no longer needed to maintain the security of any prior data.

The operation of this invention for a "first store" is different for a "first" ENTIRE page store than for a "first" PARTIAL page store. (An "entire page store" stores into all bit positions in the virtual page. A "partial page store" stores into less than all bit positions in the virtual page). Both types of stores are handled by this invention to maintain the security of prior data in the assigned backing page frame.

For any entire page store, the invention eliminates the need for physical erasure of an assigned backing page frame, unlike the prior art. An example of an entire page store is a page frame transfer operation, which involves storing all bit positions in a page frame.

The only case in which the invention does not eliminate the need for initial physical erasure of the backing page frame is for a first partial page store. For a first partial page store, a physical erasure is still done to the entire page frame prior to performing the partial store operation.

No physical erasure is needed for the page frame after its "first" store (whether the "first" store is an entire store or a partial store).

Optionally for use by fetch and partial store requests, a plurality of "form" page frames may be provided with different predetermined contents to allow selection and use of different types of form data. One or more types of form page frames, and form functions, may be provided. The form page frames may be provided in a common set usable by all system users, or each user may have its own set. A common set may be provided in a location only accessible to OS or to microcode (such as the hardware save area, HSA, in IBM mainframes) when the translation operation operates through OS or microcode.

The part of the address translation process having this invention may be provided entirely in processor microcode, which can access form page frames in either a microcode-accessible location such as the HSA, or in OS or user accessible storage.

In a preferred embodiment, a form (F) flag bit is provided in each PTE for controlling the page-initialization state of the associated virtual page. The state of the F bit in a PTE controls if and when any backing page frame can be accessed by a fetch operation. While the F bit is set to its page-initialization state, no erasure writing need be done in any backing page frame for a fetch or full-page store operation.

The PTE in the preferred embodiment also contains an optional form identifier (form#) field, which is associated with the required page-initialization state field. The form# field content identifies one of plural form functions or form page frames. For example, the form# field may contain an index into a forms table containing address entries to respective form PFs containing different form contents. A default form function or page frame may be provided at a predetermined location in the form table usable by all system users. The default form page may represent all binary zeros. Other form page frames may contain different contents such as any predetermined character, or any predetermined combination of characters and/or graphics. Other examples: an all blank EBCDIC or ASCII character page frame, or any other special character repeated throughout a form page frame, or a form page frame may contain any sequence of repeating bit patterns of any length or be a full-page template of any kind such as any type of pre-determined form, even an IRS form.

For example, a particular form may be structured by a data base subsystem, in which the form contains special information needed by the subsystem, such as containing fields for identifying to the subsystem and the user(s) of each record, and having other fields for containing control information for the subsystem. In this case, OS can assign the subsystem-designated form to each virtual page allocated to that subsystem by setting a pre-determined form value in the FORM# field of each PTE representing a virtual page allocated to the subsystem, in order to initialize each allocated virtual page. The form may contain any fields or special information requested by the subsystem which allows it to better control its data base.

Fetch-only address translations may be done faster by this invention than by prior address translation processes, because this invention avoids the page fault interruption and OS intervention required by the prior art for fetch-only operations when no backing PF is assigned to the virtual page. Thus, the invention can process all fetch-only processor requests entirely with microcode or internal code without a page fault interruption.

With this invention, fetch-only translations do not need to be put into a processor translation lookaside buffer (TLB).

With this invention, the TLB needs to receive an address translation only when its "first" store translation is performed, which occurs after all fetch-only translations are completed. Thus, only translations having no page-initialization state need be put in the TLB, since only these involve access to backing page frames in MS or ES. In this manner, the invention can reduce the number of TLB accesses needed in the operation of a processor.

Accordingly, the invention does not require the page-initialization state to be represented in a TLB, because this logical-erasure state is always off while a virtual address translation is validly contained in a TLB entry.

If a virtual page is released (unassigned) by a user, its backing PF is put into a pool of free storage space. Then, each backing PF flag field in the associated PTE entry is set to non-backing state, and any associated TLB entry is invalidated. Then, the PTE is set to the novel page-initialization state. The next time the address translation process accesses that virtual page, the page-initialization state will be found to exist in its associated PTE.

It is emphasized that this invention can be applied to any form of PTE by modifying it to contain at least the equivalent of the novel page-initialization field, described herein. Thus, the invention may be added to any prior type of PTE, including a PTE type having only a single backing page frame indicator or multiple backing page frame indicators, e.g. page indicators for one of both of MS and ES media. And with any PTE type, this invention modifies the address translation process for fetches and stores, in the manner described herein.

The invention also comprehends having OS allocate to a user a page table of one or more PTEs and initializing the PTEs to utilize form PFs. The allocation and initialization process may be done at the request of the user, or may be done automatically upon a segment fault using default information, or information previously provided to OS by the user and retained by OS for subsequent service for the user.

DETAILED DESCRIPTION OF THE EMBODIMENT

Virtual Addressing Use of PTEs and Backing Page Frames

The preferred embodiment of the invention is described within the environment of an IBM ESA/9000 computer system using virtual addressing of the type previously disclosed and claimed in previously-cited patent application Ser. No. 07/424,797 (PO9-89-018), now U.S. Pat. No. 5,237,668, in which a virtual page may be backed by a page frame (PF) assigned in either the system main storage medium (MS) or in an expanded storage medium (ES). In an IBM ESA/9000 system, a 31 bit MS logical address (virtual or real) may address any byte within MS. But a 31 bit ES address can only address a page-frame unit comprising 4096 bytes; an ES 31 bit address cannot address a byte location within an ES page frame. Hence, an expanded storage page frame (ES PF) cannot be addressed by an MS logical address, but only by an ES address, even though both types of addresses may each be 31 bit addresses. Most instructions in programs running on a processor are designed to address MS and use MS addresses in their operand fields.

Only a few special instruction types can access an ES page frame, such as the move page (MVPG) instruction, the pagein (PI) instruction, or the pageout (PO) instruction. These special instructions only copy an ES page frame into MS, or copy an MS page frame into ES without changing the content of the source page. The move page (MVPG) instruction is an instruction which currently exploits virtual addressing for moving pages between page frames in MS and ES. To do this, MVPG required a modified form of the PTE to be provided for use by virtual addresses. MVPG added an ES indicator to the PTE, which already contained an MS page frame indicator. Either the MS or ES indicator may be set to indicate an address field in the PTE contains an associated MS or ES page frame real address, which assigns a backing page frame to the virtual page represented by the PTE. The MVPG instruction senses both MS and ES backing PF indicator bits in the modified PTE to accordingly interpret whether an address field in the PTE contains an ES block number or an MS real address.

However, this invention embodiment further adds an F bit indicator and a form# field to the MVPG type of PTE to provide novel functions very different from the functions of the MVPG instruction.

Processors using the subject invention are presumed to be using virtual addresses. When executed, virtual addresses are translated to real addresses, and MS real addresses are transformed into MS absolute addresses. (The only difference between MS real and absolute addresses is in the location of real page frame zero (which defines a prefix page frame when there are more than one central processor in the system), since each central processor needs a unique prefix page to retain its unique processor data, e.g. interruption addresses, etc. All virtual address spaces translate their prefix page addresses to real address zero, which is then prefixed to the absolute addressed page frame for the particular processor which happens to be running its program. Thus, absolute addressing only transforms real address zero (prefix address) for each central processor into a different absolute address by assigning a different prefix page frame in main storage for the respective central processor, so that all central processors have a non-conflicting prefix page frame. Each other MS page frame has its real address equal to its absolute address for all processors.)

Prior art virtual addresses for instructions and instruction operands are always accessed in backing page frames in computer main storage (MS), except for the MVPG instruction and asynchronous data mover in prior application Ser. No. 07/424,797 (PO9-89-018) and 07/816,917 (PO9-90-030), both previously cited. This is not the case with the subject invention.

In the preferred embodiment, if the address field in the PTE is for an MS PF, it can address any byte location in the MS PF. But if the address field in the PTE is for an ES PF, it can address only an entire PF in ES as a unit of ES storage, and cannot address a byte location in the ES PF. Accordingly, if an instruction requires an access to a byte address, and the backing PF is indicated in the PTE to be in ES, an exception occurs so that OS can move the page from ES to MS where a byte location can be accessed. (The ES form of addressing may be changed in another embodiment so that a byte address in ES might be accessed directly without first transferring the page to MS, thereby eliminating the exception condition for this event.)

Initialization Control in PTE

The page-initialization controls of this invention impose novel forms control on backing page frames used in a virtual address translation process, which modifies the address translation process currently used in IBM mainframes, e.g. ESA/9000. The page-initialization controls maintain security for any prior data in a backing page frame assigned to another virtual page by making prior data in the page frame inaccessible to any user of the another virtual page. Also, using the forms control of this invention obtains a system performance advantage over the prior art technique of erasing all contents of every backing page frame to maintain security of prior data in each page frame whenever it is reassigned.

The address translation process first looks in a translation lookaside buffer (TLB) to find if the requested virtual address has a backing page frame (PF) assigned to it by a previous address translation. If a valid translation exists in the TLB, its real page frame address (PFRA) is obtained from the TLB and the backing PF is accessed to fetch or store the requested data for the current processor operand request.

Figure 3:
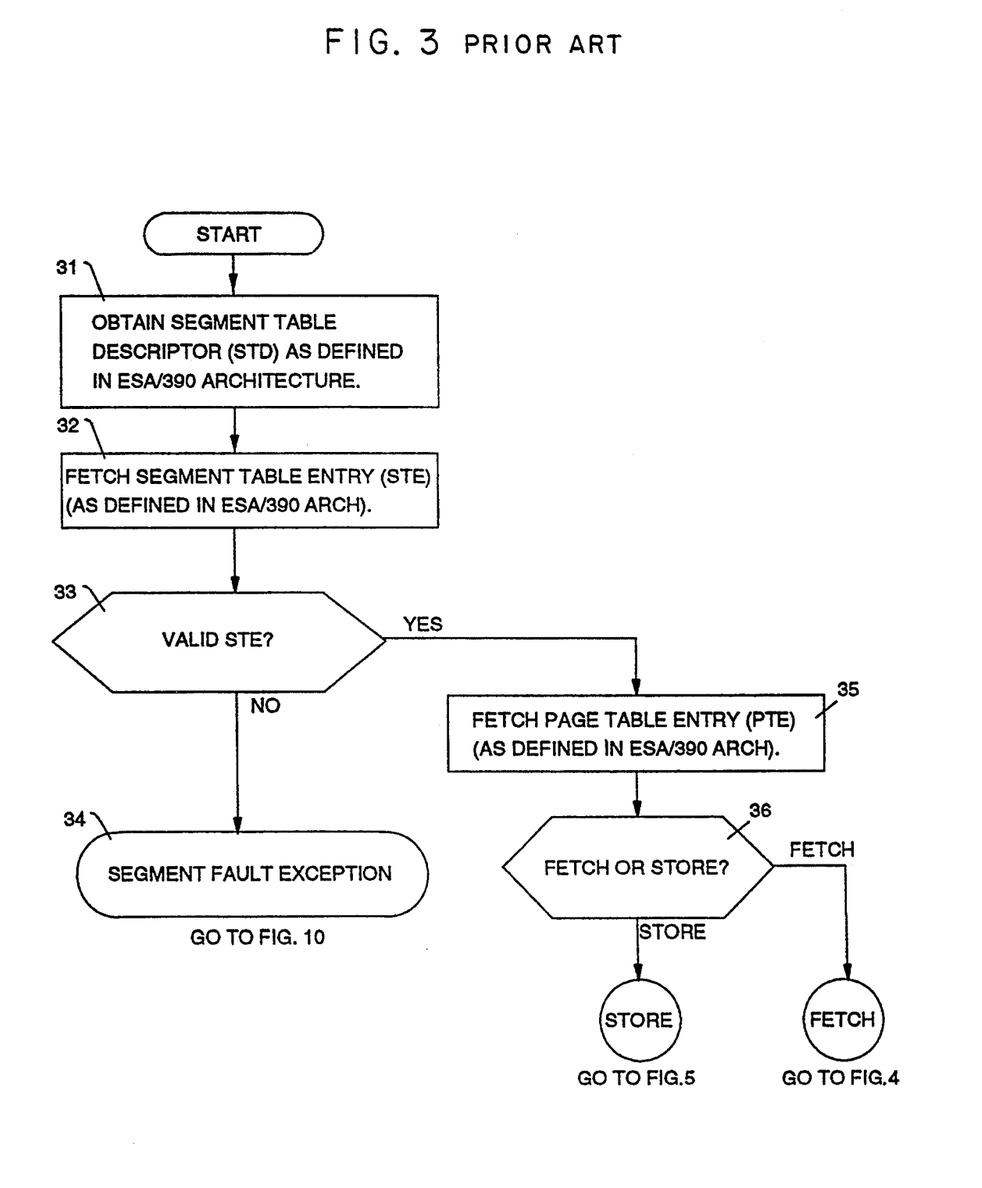
FIG. 3 represents prior art steps in the process of starting a translation of a virtual address requested by a processor.

When the TLB does not contain a valid address translation, the address translation process is continued to completion for the current processor request. In such case, the prior art process in FIG. 3 is executed in the preferred embodiment in a process for accessing a required PTE representing the virtual page for the current request.

Figure 1:
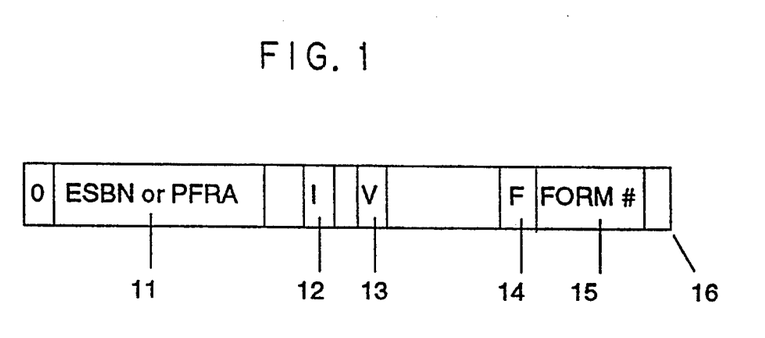
FIG. 1 represents a novel page table entry (PTE) in a page table used in the preferred embodiment.

Form of PTE in FIG. 1

FIG. 1 represents a modified PTE used in the preferred embodiment of the invention. It is however emphasized that this invention can be used with any form of PTE, including prior PTEs having only a single backing page indicator for the single MS medium. In such case, this invention still applies to fetches and stores within the same medium.

The PTE in FIG. 1 is capable of indicating a backing page frame in either the MS or ES medium. It also allows the use of the MVPG instruction for moving a page of data between source and the destination operands within MS, within ES, or between the MS and ES media while using MS virtual page addresses for both operands. Each virtual operand in the MVPG instruction may be backed in either media, MS or ES. That is, the virtual address of each operand translates to a PTE which may specify a backing page frame in either MS or ES media.

Which medium (MS, ES, or no medium) contains a backing page frame is indicated by the settings of flag bits 12 and 13 in the PTE, respectively containing bits I and V for the MS and ES media. If one of flag bits I (for MS) and V (for ES) in the PTE indicates a backing page frame exists (only one of I or V can so indicate), then field 11 in the PTE contains the real address of the backing page frame in the indicated medium.

If bit I (MS flag bit) is set to 0, PTE field 11 is indicated to contain a valid PFRA (page frame real address) in MS; and if bit I is set to 1, PTE field 11 does not contain a valid PFRA. Similarly (but in an inverted sense), if bit V (ES flag bit) is set to 1 the PTE contains a valid ESBN (expanded storage bin number); and if I is set to 0, the PTE does not contain any valid ESBN. Thus, field 11 contains either a PFRA in the MS medium, or an ESBN (ES block number) in the ES medium, or nothing, depending on the settings of flag bits I and V.

For example, if I,V=0,0 then field 11 contains a valid PFRA which locates a main storage page frame (MS PF). And if I,V=1,1 then field 11 contains a valid ESBN which locates an expanded storage page frame (ES PF). But if I,V=1,0 then field 11 indicates the PTE does not address any backing PF; and then the virtual address represented by the PTE is not backed by any PF (which requires page fault signalling to invoke OS processing that assigns a PF in either MS or ES to back the respective operand's virtual address by writing a PFRA or ESBN in field 11, which is required for program execution to continue.

Form Field Controls in PTE

In FIG. 1, an F bit field 14 (provided by this invention in the PTE) is set-on whenever a virtual page requires initialization regardless of the content of any assigned backing page frame.

The PTE is also shown containing a form number field (form#) 15 which is an optional feature of this invention used in the preferred embodiment. Form# 15 contains an index number for locating an entry in a form entry table (formlist) 20 shown in FIG. 2. The value in the form# field 15 selects one of the plural entries in formlist 20 by indexing to its address in the entry. The real address in the selected entry locates the selected one of N number of "form" page frames (PFs) 21F through NF represented in FIG. 2. Formlist 20 is located by an absolute address (FL origin) in a control register, which also contains the length in bytes of the formlist 20 in its "FL length" field.

Figure 2:
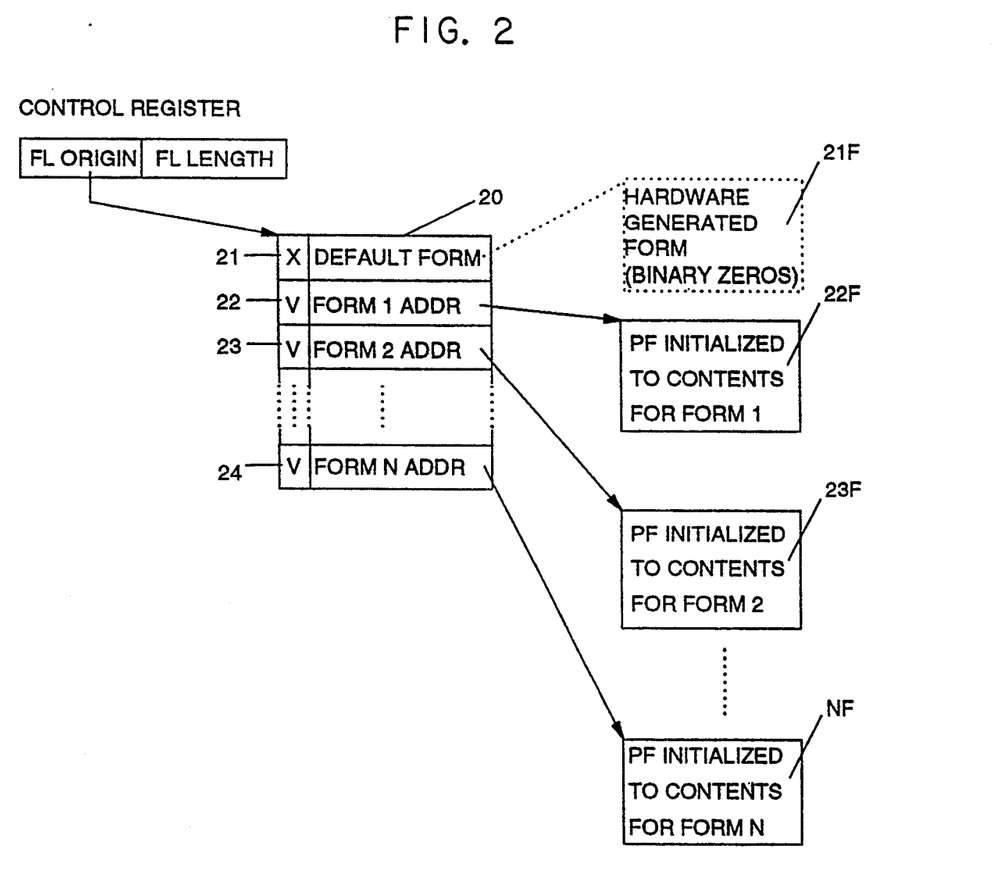
FIG. 2 illustrates a set of page frames (PFs) initialized to contain different types of pre-determined form data.

When there is no form# field 15 provided in the PTEs, or if there is a zero value in form# field 15, a default access is taken in formlist 20 to its first entry 21 to provide an all zero fetch access. The first formlist entry 21 contains an address that locates a function which generates binary zeros to provide the equivalent of an access in an all-zeros PF, or the processor generates a page of binary zeros without using the form PF address.

Each of the other form PFs (22F - NF) shown in FIG. 2 contains a different content. For example, form 22F may contain only binary ones, form 23F may contain only blank characters, through form NF, in which each form PF may contain a different combination of predetermined characters or graphics. Each form-page content is designed to represent the logical initialized content backing page frames for one or more users of the system.

The formlist 20 may be located in a system area of storage, which is only addressable by microcode, or it may be located in an area of MS accessible to only OS, or alternatively to any program. Each entry in formlist 20 contains a validity bit indicating if the address field in the entry points to a valid form page (21F, 22F, 23F . . . NF).

Each processor fetch-only request to a virtual storage address is to the selected form PF which provides the PTE-specified pseudo backing page frame (PF) for all fetch-only requests. Even if a real backing PF was assigned to the virtual page, the fetch-only accesses for the virtual address will be diverted to the form PF, ignoring the assigned backing PF until if and when the first store request occurs to that virtual page. The diversion of the fetch access to the form PF assures that the security of data in any real PF backing the page frame is maintained because no fetch is permitted to the real PF until after the first store request to the PF, at which time any prior data is obliterated by the store operation.

The following Table 1 is a summary of operations of the preferred embodiment for processor operand requests 5 using virtual addressing, as follows:

TABLE 1

FOR PF ASSIGNED in MS or ES MEDIUM

| Valid Form Page | Backing PF Valid | Resulting Action by the CPU |
|---|---|---|
| FOR FETCH ACCESSES | | |
| 1. No (no F bit) | No | Page Fault Exception |
| 3. No (F=0) | Yes | No Page Fault Exception, contents of the PF are fetched. |
| 5. Yes (F=1) | No | No page fault exception, contents of the PF are ignored. The fetch made from the form page identified by form# field for both full-page and partial-page fetch operations, the latter fetches only a portion of the page addressed. |
| 7. Yes (F=1) | Yes | No page fault exception, contents of the backing PF are ignored. The fetch is made from the form page identified by form# field for both full-page and partial-page fetch operations, the latter fetches only the portion of the page addressed. |
| FOR STORE ACCESSES | | |
| 2. No (no F bit) | No | Page Fault Exception |
| 4. No (F=0) | Yes | No page fault exception, contents of the PF are replaced by the store data. |
| 6. Yes (F=1) | No | Page fault exception. OS assigns and validates PF to the virtual page. Re-execute faulting instruction to retry store operation. |
| 8. Yes (F=1) | Yes | No page fault exception, contents of the backing frame are replaced by the store data for a full page operation. If partial page operation, then copy the form page contents identified by form# field into the PF and then perform partial page store of store data. Finally, turn off the F-Bit. |

In Table 1, each odd-numbered row for a fetch request is related to the next even-numbered row for a store request, in that they are dealing with similar types of requests.

The rows 1 and 2 in Table 1 represent fetch and store accesses using prior types of PTEs not having any F bit 14 or form# field 15.

Accessing a PTE

FIG. 3 provides a process for accessing a PTE for a virtual address being requested by a processor. A two level virtual address translation process is used in the preferred embodiment using the IBM ESA/390 architecture rules. However, the type of computer architecture used for address translation is not important to the fundamentals of this invention, since any address translation process which uses page tables can be used, such as in single level address translation processes used by other computer architectures. This invention only requires that the page table representation of a virtual page (equivalent of a PTE) contains the equivalent of the F bit and it may optionally contain the equivalent of the form# field.

The preferred embodiment's translation process is initiated by processor requested virtual address in step 31 of FIG. 3 which causes an STD (segment table descriptor) to be accessed from an ESA/390 Control Register (or obtained from the result of an Access Register Translation described in prior art) to locate a segment table. Then step 32 finds the segment table in which a segment table entry (STE) is located with a segment index part of the virtual address being accessed. The content of this STE is accessed.

Then step 33 tests a valid bit state in the STE for validity to find if the STE points to a valid page table (PT) in MS representing that segment in the virtual address space. If not valid, step 34 is entered to generate a segment fault exception to the control program to indicate the need to allocate and initialize a page table of PTEs containing the PTE needed for the current address translation operation, which will be repeated after the new page table is allocated and initialized. This page table allocation and initialization is performed by the process in FIG. 10 which responds to the segment fault exception condition.

If the test by step 33 finds the STE is valid, step 35 is entered to use the page index part of the virtual address to locate and fetch the Page Table Entry (PTE) required in the accessed page table in MS, in accordance with existing ESA/390 architecture virtual address translation rules.

Figure 4:
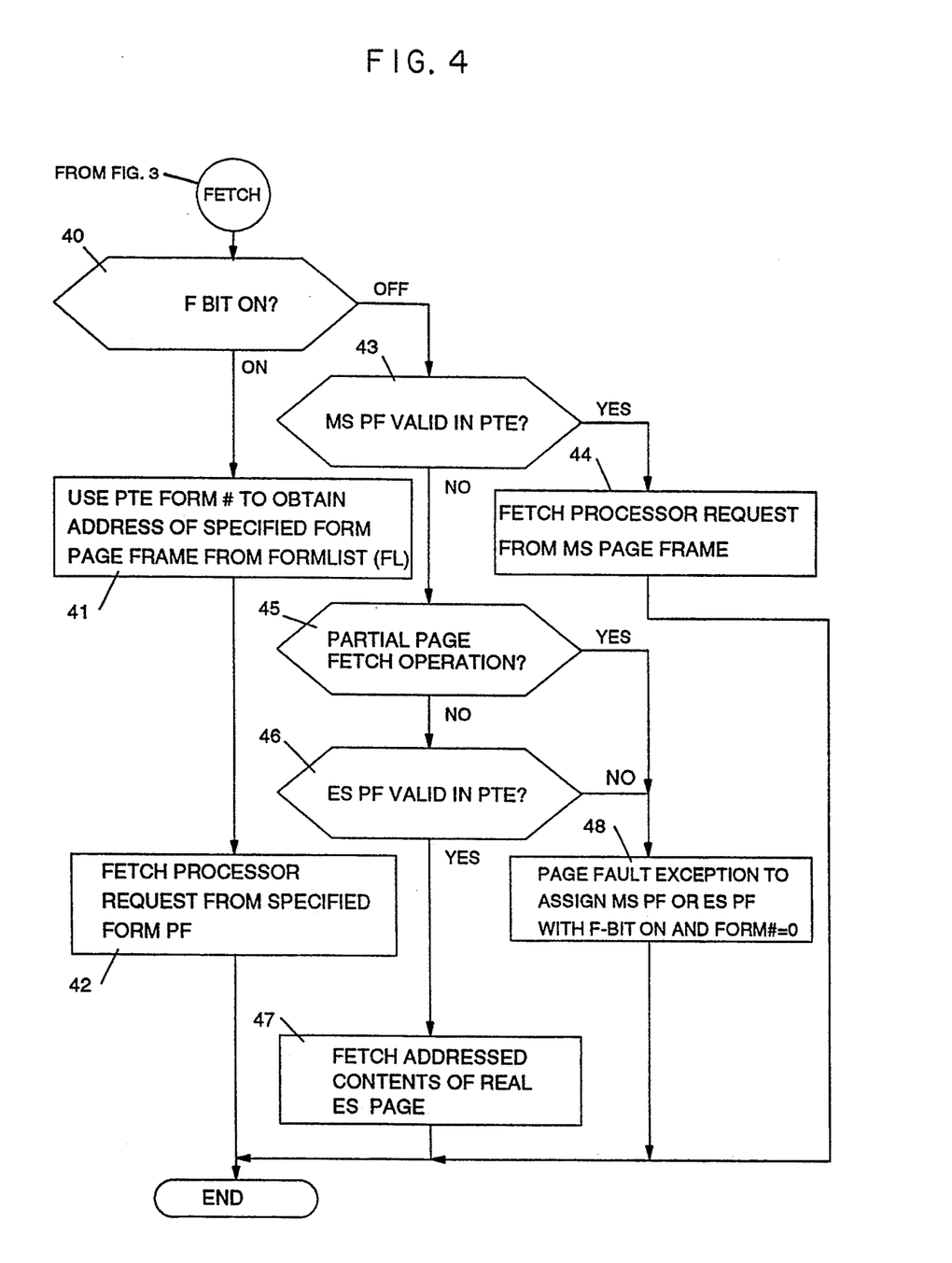
FIG. 4 represents a novel processor fetch operation performed by a preferred embodiment of the invention.
Figure 5:
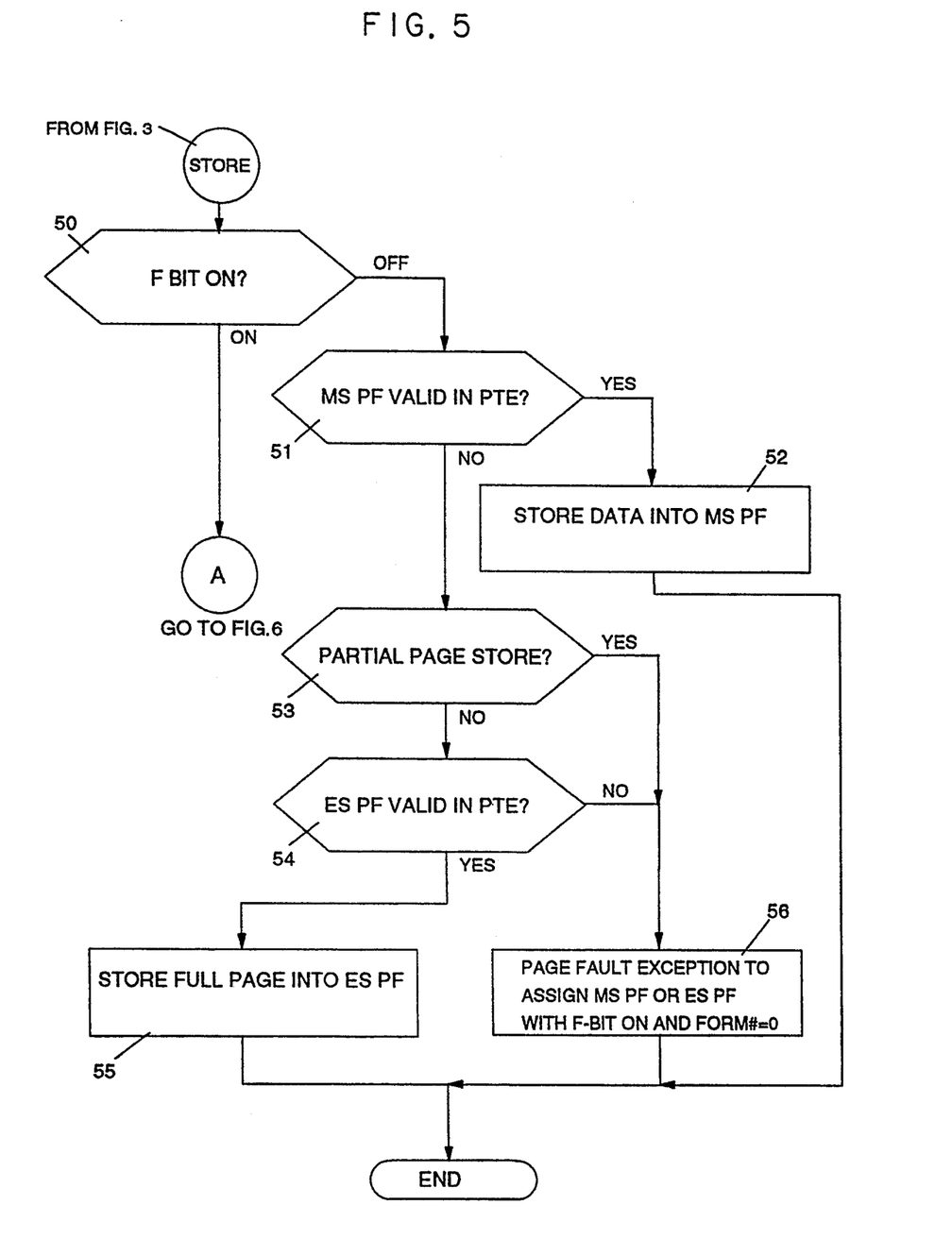
FIG. 5 represents a novel processor store operation performed by a preferred embodiment of the invention.

Then step 36 tests the processor request for a store-type or a fetch-type request to storage, since the handling is different for the two types of access. FIG. 4 is entered for a fetch-type access, and FIG. 5 is entered for a store-type access.

Fetch Processing

FIG. 4 is a flow diagram for a processor fetch processing. First step 40 tests the F bit state in the accessed PTE. If the F bit is set on in the PTE, it is indicating a fetch-only type of request. Then, the virtual page is to be backed by a form page PF (or simulated form PF) identified in the Form # field in the PTE. The virtual page is form-backed for all fetch-only requests, regardless of whether or not an actual backing page frame is assigned to the virtual page in either MS or ES. Form-backing allows the processor request to access actual data without physically initializing any assigned backing PF, and without requiring the assignment of any backing PF. Form-backing maintains the security of any prior data in any assigned backing page frame due to the diversion of the fetch access to the form PF (instead of accessing any assigned PF). If no page frame has been assigned to back the virtual page, then none is assigned for a fetch-only request. This fetch-only processing cannot be done in prior art address translation processes.

If step 40 finds the F bit is on (indicating page-initialization state), step 41 is entered to use the PTE form# 15 to obtain the address of the specified form PF. Then step 42 accesses that form PF to satisfy the fetch request, and complete the access. The access is to a displacement (D) location in the page.

However, if step 41 finds the F bit is off (indicating no page-initialization state), the request is a non-fetch-only request, which requires an existing assigned backing PF. Step 43 is then entered.

Store Processing

If FIG. 3 step 36 indicated a store-type operation, FIG. 5 is entered to handle all store-type operations.

First step 50 in FIG. 5 tests the F bit state to see if a form PF is assigned to the virtual page. If a form PF is assigned, the ON path from step 50 is taken to EXIT A which goes to FIG. 6. If the F bit is in off state, steps 51 through 56 are executed (they represent prior art steps operating in the manner described in application Ser. No. 07/424,797 (PO9-89-018)).

Figure 6:
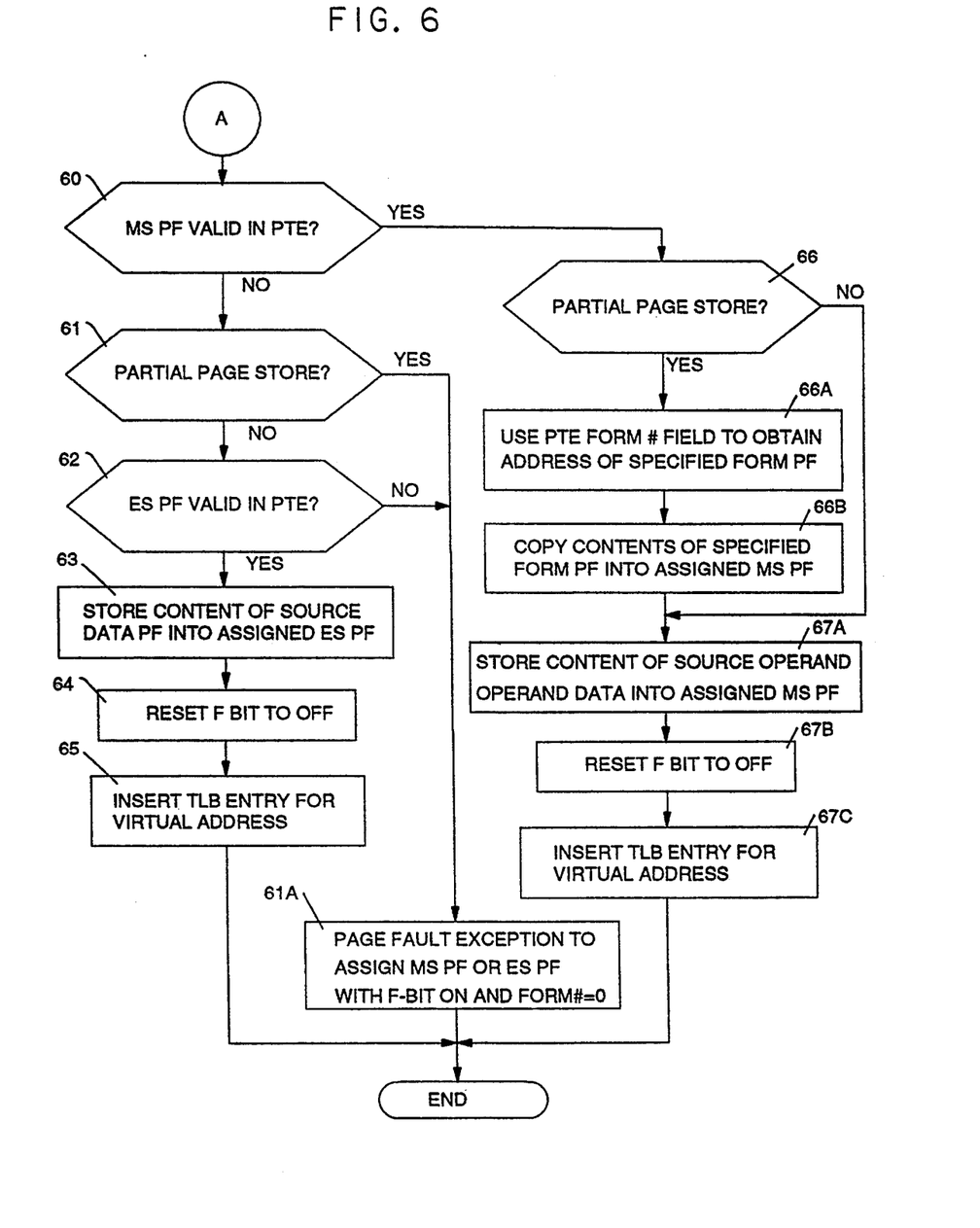
FIG. 6 represents a continuation from FIG. 5 of the novel processor store operation performed by a preferred embodiment of the invention.

In FIG. 6, step 60 tests the I bit 12 in the accessed PTE representing the current virtual page to determine if there is a valid MS backing page frame. If not, step 61 is entered to test if this is a partial-page or full-page store access. (This invention operates differently for these two types of stores.) If step 61 indicates a partial-page store access operation, ES cannot be directly accessed, since it is only a full-page addressed storage medium (i.e. no byte addressing), and control passes to step 61A to generate a page fault exception. A backing page frame in MS is required to execute a partial-page access, which will be obtained by the OS in response to the page fault exception of step 61A.

If step 61 indicates this store is for a full-page operation, the NO exit is taken to step 62, which tests the V bit 13 in the PTE for an indication of a valid ES backing page frame. If there is none, control passes to step 61A to generate a page fault exception to obtain an assignment of a backing PF in MS or ES. If step 62 finds a backing ES page frame exists, step 63 is entered to store the full-page store (provided by the current processor request) into the ES PF. Then step 64 sets off the F bit, completing the full-page store access. Final step 65 in this path in FIG. 6 inserts the translation information obtained by this address translation into a TLB (translation lookaside buffer).

If EXIT A is taken from FIG. 5, step 60 is entered in FIG. 6 to test if backing MS PF exists, which is indicated by the state of I bit 12 in the PTE. If an MS PF is assigned it is indicated by a valid state for the I bit. Then step 66 is entered to test if this is a partial-page or full-page store access. (This novel path operates differently for these two types of stores.) If step 66 indicates a full-page store access operation, the NO exit is taken from step 66 to step 67A, in which the full-page (associated with the current processor request) is stored into the backing MS PF. This full-page store operation destroys any prior data that may exist in the MS PF to prevent its access by the current user of the PF which maintains the security of prior data.

Then step 67B sets off the F bit state, completing the full-page store access.

However, if step 66 finds a partial-page store is being requested by the processor, step 66A is entered to use the PTE form# field to obtain the address of the specified form PF. Step 66B then copies the contents of the specified form PF into the assigned MS PF. This entire-form store operation destroys any prior data that may exist in the PF, to prevent it from being accessed by the current user of the PF which maintains the security of any prior data in it. Next, step 67A is entered, which operates as previously described to perform the processor partial store, and step 67B sets off the F bit to complete the partial store operation. Final step 67C in this path in FIG. 6 inserts the translation information obtained by this address translation into a TLB (translation lookaside buffer).

Allocation and Initialization of Form Page Frames

Figure 7:
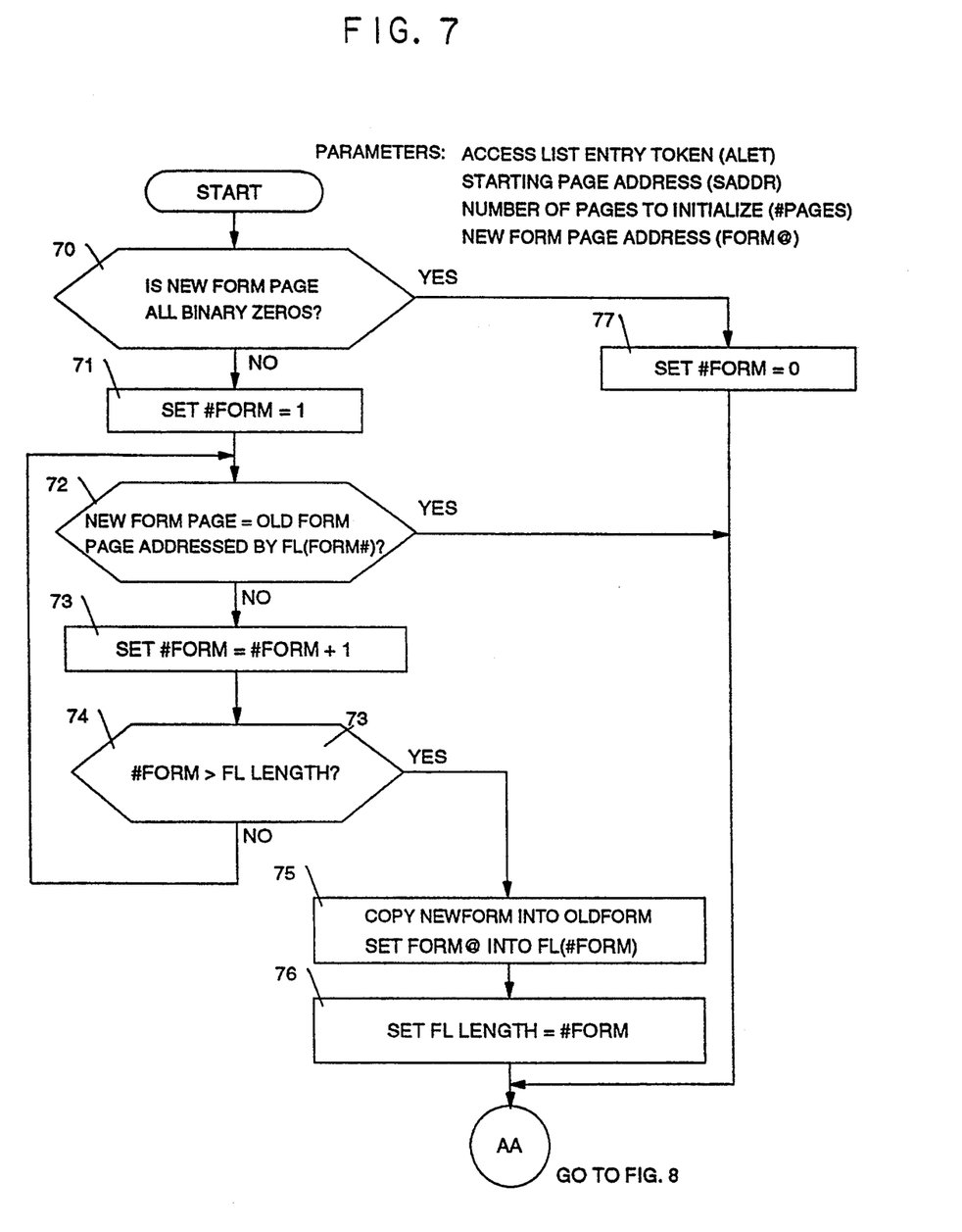
FIGS. 7, 8 and 9 provide a flow diagram of a novel process used in an "initialize range program" which allocates to a requesting user a segment of virtual space comprising one or more virtual pages, builds an OS location table (formlist) to include a form page frame having a content designated by the requesting user, and initializes the allocated virtual pages as being initially backed by the requested form page frame for use by the user's fetch and store requests when issued by a processor.
Figure 8:
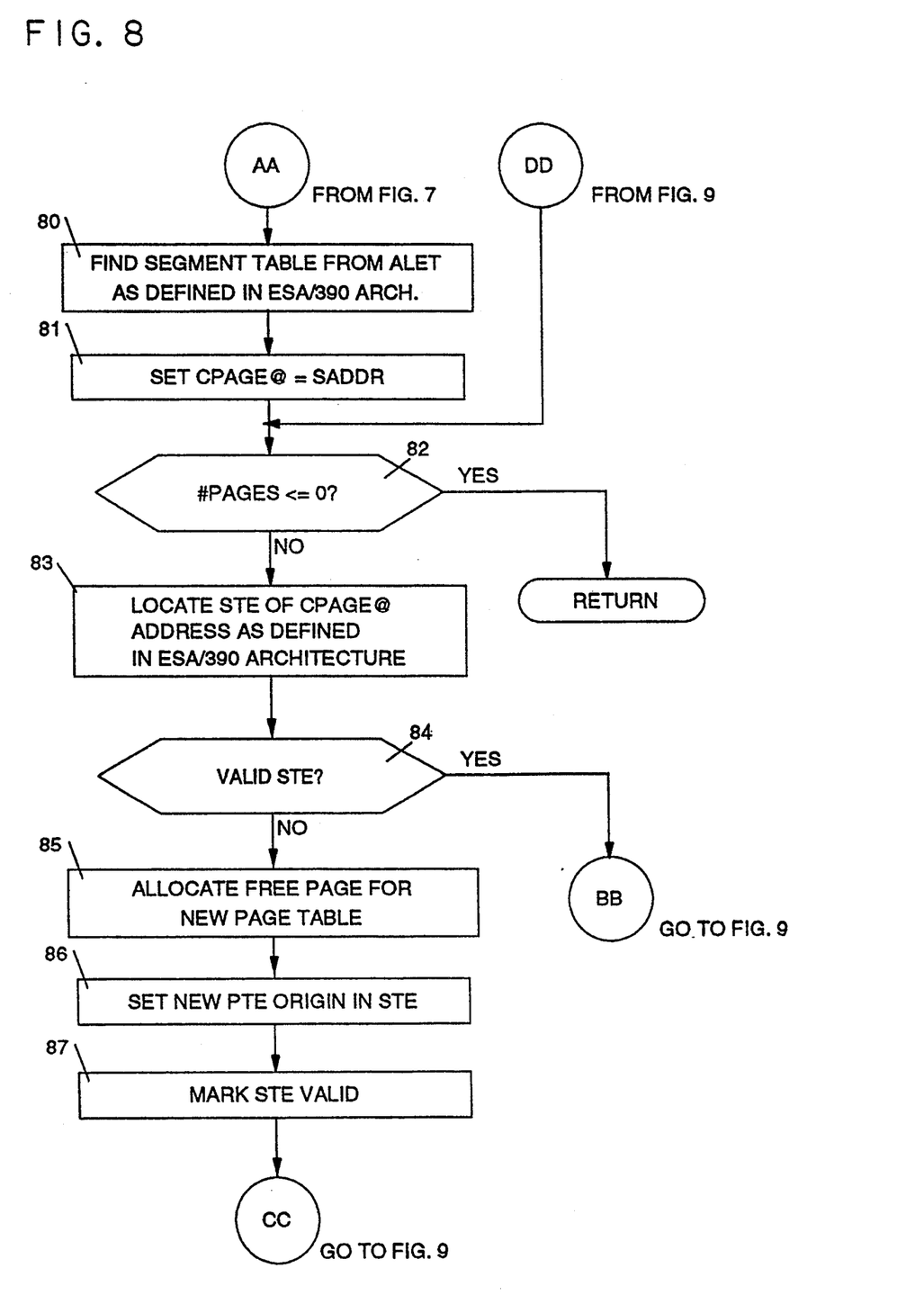
Figure 9:
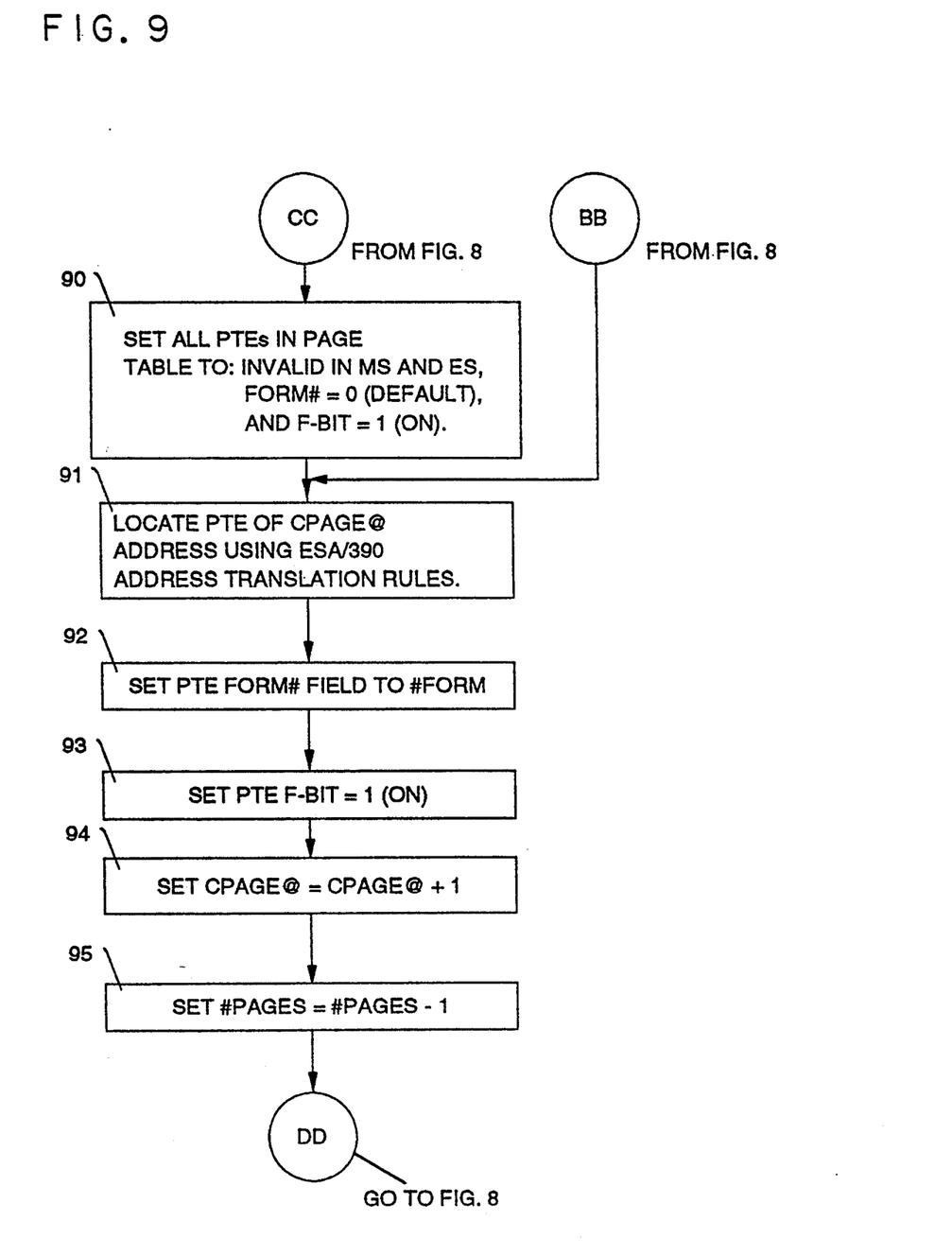

The process in FIGS. 7, 8 and 9 (herein called an Initialize Range Program, IRP) is provided in the preferred embodiment to enable an unprivileged user to request the OS to allocate and initialize a set of virtual pages for the user. Any application program or subsystem program may use the IRP process to obtain an allocation of initialized virtual pages.

To make this request to OS, a user specifies a number of virtual pages to be setup in the user's address space, and provides a sample content in a user page frame to be used for initialization of the virtual pages in the set. Then, the requested virtual pages will be allocated and initialized by OS executing the IRP process to set up the requested number of PTEs in which their respective form# fields indicate the requested virtual content of these allocated virtual pages.

The user passes parameters to OS indicating the number of virtual pages to be allocated, and the desired virtual content, before the user invokes the IRP process. Many iterations of the IRP process may be needed to allocate and initialize the requested number of virtual pages for the user.

To use the IRP, the user must specify a number of parameters in the user's virtual address space, and make them known to OS. These parameters include:

ALET (Access List Entry token) - This parameter defines the user's virtual address space in which the user wants OS to initialize the requested number of virtual pages. OS will build a page table to represent these user requested virtual pages.

PAGES (Number of contiguous user pages) - This parameter indicates the number of contiguous virtual pages which the user wants initialized having an origin at the SADDR location.

"FORM@" (Address of a user's virtual page, NEW-FORM) - This parameter is the address of a user's virtual page, NEWFORM, which has a user-filled content that the user desires to have in each of the requested virtual pages.

SADDR (Starting page virtual address) - This parameter is the user virtual address of the first user requested virtual page in a contiguous set of user virtual pages.

NEWFORM is the sample form page frame generated by the user with the form contents desired by the user.

OS will initialize each of the allocated user virtual pages to contain the NEWFORM content (in a virtual sense) by operation of IRP. That is, this virtual content will be logically initialized in each of the requested virtual pages by OS inserting in the form# field of each of the PTEs an index value (to the formlist 20 in FIG. 2) representing a form PF in the OS set containing the user requested NEWFORM content. This OS form PF will be accessed by any processor fetch-only or first partial store request to these virtual pages.

Step 72 in the process in FIG. 7 determines if NEW-FORM is represented in the OS set (formlist in FIG. 2 and its form PFs); and if NEWFORM is not represented in formlist, step 75 will add it to the OS set. If NEW-FORM is not found in the OS set, a new OS form PF is inserted copying NEWFORMPF into the OS set of form PFs, and the address of that new form PF is put into a newly validated entry in the formlist. The set of form PFs in the OS protected area cannot be directly accessed by any unprivileged user of the system, but is accessed through the form# fields in the PTEs, as previously explained herein.

The process in FIG. 7 uses an internal counter, #FORM, which contains the current count of an OS form PF called "old form".

In FIG. 7, the IRP starts with step 70 testing if the content of NEWFORM is all binary zeros. If yes, step 77 is entered to set the #FORM count to zero, and exit AA is taken to FIG. 8. An all-zero NEWFORM content is a recognition of the user requesting the all-zero default form PF which contains all binary zeros.

If step 70 finds the content of newform is not all binary zeros, step 71 is entered to set the #FORM count to 1, for accessing the non-default index entry in formlist. Formlist is abbreviated as FL in FIGS. 7, 8 and 9. In step 72, the #FORM count is used to index to an entry in formlist to obtain the address of a form PF called OLDFORM in the OS set. The indexed location of OLDFORM is FL(#FORM). Step 72 then compares all 4096 bytes in the OLDFORM and NEWFORM page frames. If step 72 finds the content of OLD FORM compares equal with NEW FORM, the form content is indicated to have previously been put into the OS set, and there is no need to do it now. And the yes path is taken to exit AA and FIG. 8 is entered.

But if OLDFORM and NEWFORM compare unequal in step 72, the no exit is taken to step 73 which increments the #FORM count by one to index to the next OLDFORM form PF in the OS set. Step 74 is then entered.

Step 74 compares the current value of #FORM with FL LENGTH. FL LENGTH is a value in a control register which indicates the number of valid OLDFORMs that exist in the formlist. (The control register also has a pointer to the formlist.) If step 74 finds #FORM is not greater than FL LENGTH then the next entry in formlist is still a valid entry, and the process iterates back to step 72 to examine the content of the next OLDFORM in the OS set to see if its content is equal or not to NEWFORM.

If step 74 finds #FORM is greater than NEWFORM, the last OLDFORM in the current OS set has been tested, and none of the OLDFORMs has been found to have the user desired content provided in NEWFORM. Then, the yes path is taken from step 74 to step 75, and step 75 inserts a new form PF in the OS set having the current user requested content of NEWFORM. To do this, step 75 copies the content of NEWFORM into a new form PF provided by OS for the OS form set. Then OS puts the address of this new form PF into the first invalid entry in formlist and marks it valid.

And then step 76 sets the FL LENGTH field to the current #FORM value in the control register in FIG. 2, since the value of #FORM has been incremented to the new number of OLDFORMs in the OS set. Then, exit AA is taken to FIG. 8.

FIG. 8 continues the processing of the Initialize Range Program (IRP) to determine if a page table exists which contains the PTEs needed for the user requested allocation. A page table is located by a segment table entry (STE) in the ESA architecture rules which are being used here. If no page table exists for the requested allocation, the IRP will generate an STE for locating the page table.

The process in FIG. 8 uses an internal working register, CPAGE#, which contains the virtual address of the user virtual page being currently initialized.

When entered at AA, step 80 is entered and obtains the ALET parameter passed to OS by the user. The ALET is used by OS to obtain the STO (segment table origin) that addresses the segment table that defines the user address space. The STO is in an OS table, called ASTE in the prior art, and is found by using pre-existing access register translation rules of the Enterprise Systems Architecture (ESA/390).

Then step 81 in FIG. 8 is entered to initialize a CPAGE# internal working register by storing in it the SADDR parameter which is the initial user virtual address. On each pass through IRP step 94 in FIG. 9, the content of CPAGE@ is incremented by 4096 bytes to the virtual address of the next page in the user set. The CPAGE@ register contains the virtual address of the current user's virtual page being initialized. Incrementing CPAGE@ generates the user virtual addresses in sequence for the initialization of each next virtual page. A #PAGES counter is initially set to contain the number of virtual pages requested by the user (when the CPAGE@ register initially contains SADDR.) The #PAGES count is decreased by one after each page is initialized. When the last user virtual page is initialized, #PAGES becomes equal to zero.

Step 82 tests #PAGES to see if it is equal or less than zero, indicating that all user virtual pages have been initialized. If #PAGE is not zero, more of the user's virtual pages remain to be initialized, and step 83 is entered. Step 83 uses the current CPAGE@ value set in step 81 or received from step 94 in FIG. 9 via entry DD. Step 83 translates the CPAGE# address to obtain its STE and PTE, and step 84 tests its STE for validity. If valid, a current page table exists containing the PTEs needed for the user's virtual page allocation, and exit BB is taken to FIG. 9.

But if step 84 finds the STE invalid (which indicates it does not address any page table), the no path to step 85 is taken, and step 85 allocates a page of OS space for a new page table. Then, step 86 writes the origin address of the page table in the STE, and step 87 sets on the valid bit in that STE. Exit CC is then taken to FIG. 9.

In FIG. 9, step 90 generates the PTEs in the page table and pre-initializes all of them by setting their backing flag bits to indicate invalidity of all backing MS PFs and ES PFs (I=1 and V=0), and sets on the F bit in each PTE (sets F=1) and sets the form# field in all PTEs to all zeros to select the default form PF. (The number of PTEs in the page table may be different from the number of pages requested by the user, since a standard size page table will be generated.) Then step 91 is entered to set the form# fields in the number of PTEs requested by the user to the form requested by the user, if different from the default form#.

Step 91 can also be entered from exit BB in FIG. 8, in which case there is a valid STE and existing page table containing PTEs which need to be initialized to the user requested form#.

Step 91 locates the PTE found by continuing the translation process started in step 83 in FIG. 8 to locate the PTE which will be currently handled in next step 92. Step 92 sets the form# fields in the PTE to the form# providing the content the user requested in its NEWFORM page frame. And then step 93 sets the F bit on, even if it was already set on by step 90, since it may not be on if the step 93 was entered through FIG. 8 exit BB.

Step 94 increments CPAGE@ by one page to address the next virtual page in the user specified range of pages to be initialized.

The next step 95 decrements #PAGES by one to decrease the number of user virtual pages still needing to be initialized. Then, exit DD is taken to FIG. 8 where step 82 will end the initialization process of IRP when all of the user requested pages have been initialized, which is indicated when the counter, CPAGE#, reaches zero.

Page Table Allocation

Figure 10:
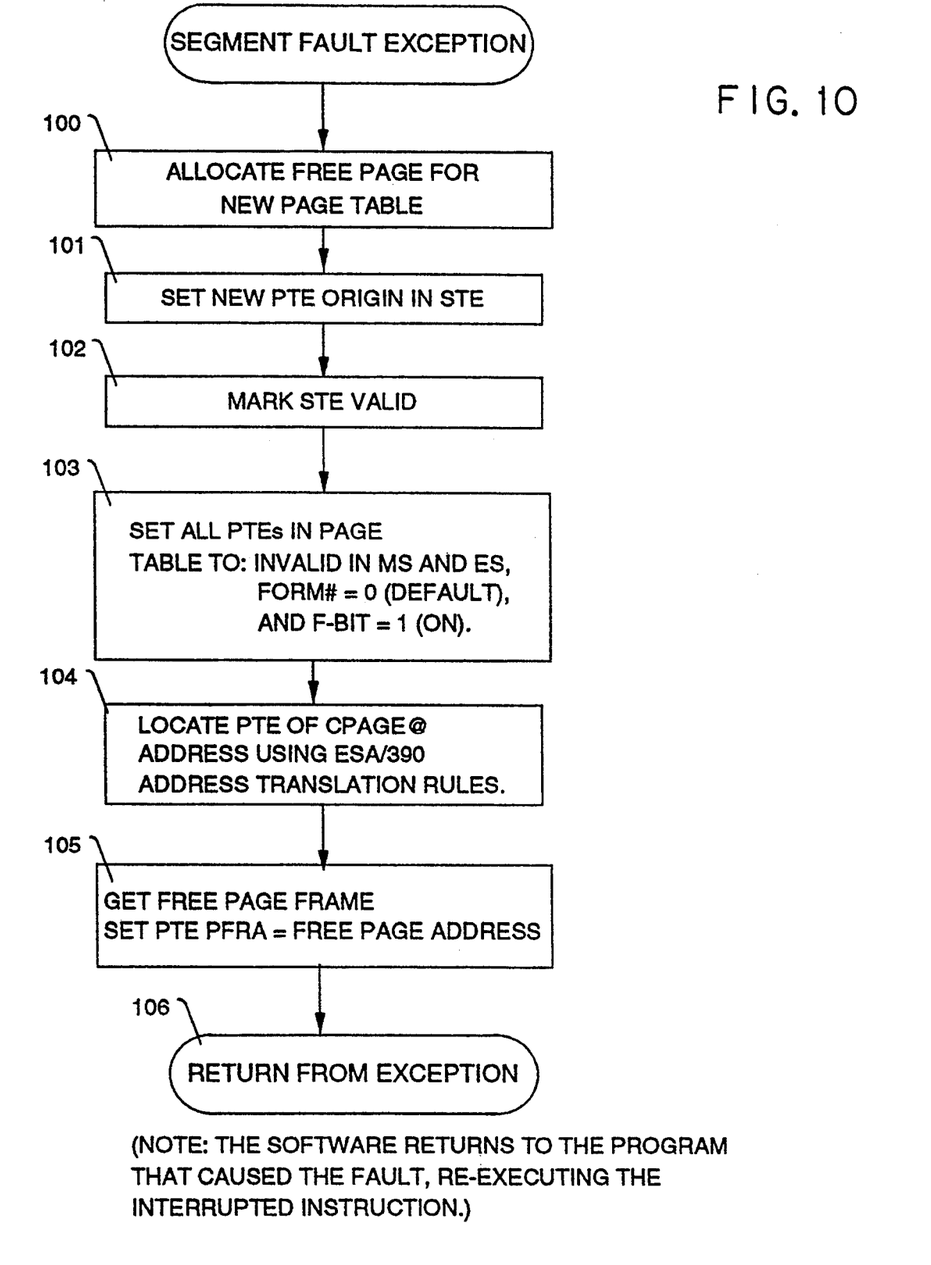
FIG. 10 represents a novel process for handling a segment fault exception occurring during an address translation process, during which a page table is initialized by this invention.

FIG. 10 provides an OS process for allocating a new page table containing a valid PTE required in a current virtual address translation which has a segment fault exception, such as during step 33 in FIG. 3. In FIG. 10 step 100, the process allocates an OS PF for containing the new page table. Then step 101 sets the real address (origin) into the STE having the segment fault exception, and step 102 sets the valid bit in the STE to indicate the STE is now in valid state.

Then step 103 sets all of the backing page frame indications in all of the PTEs to the non-backed state, sets on the F-bits (to F=1) in all of PTEs to the page-initialization state, and sets the FORM# field to the default state in all of the PTEs in the page table. The FORM# fields could be set to a user selected value if the process in FIGS. 7-9 occurred earlier and OS stored the users parameters for future reference as a user-specified default form, in which case the PTEs in the page table have their initialization form# made equal to the number of the form previously specified by the user. Then in step 104, address translation is performed on the virtual address in the CPAGE@ register, in order to find the PTE of the virtual page that was accessed and caused the segment fault. Step 105 will have OS obtain a free (available) PF from a pool of available PFs, and allocate it to the faulting PTE as a backing PF. The process assigns that PF as the backing PF to the PTE by setting the real address of the obtained PF into the PFRA field of the current PTE having the exception. The backing processing for the virtual page having the exception is completed by setting on a backing indication (e.g. setting I=0 or V=1) in the PTE to indicate the medium containing the backing PF.

Finally, step 106 cause a return to the process which called the segment fault exception process, which for example may be the process in FIG. 3 at step 34.

Many variations and modifications are shown which do not depart from the scope and spirit of the invention and will now become apparent to those of skill in the art. Thus, it should be understood that the above described embodiments have been provided by way of example rather than as a limitation.

Having thus described our invention, what we claim as new and desire to secure by Letters Patent is:

1. A method of obtaining security of data contents of page frames in a storage of a computer system, comprising the steps of:
   generating page tables having page table entries (PTEs) for defining virtual pages in a virtual storage for use by one or more programs, each PTE containing a prior-data security field (F) initially set to a prior-data state for preventing access to prior data which may be contained in a backing page frame in real storage after assignment of the backing page frame to a PTE, each PTE also containing one or more backing page frame indicator field(s) initially set to indicate no backing page frame is assigned to a virtual page represented by the PTE;
   processing fetch operands and store operands in whatever order issued by a program being executed in the computer system, a fetch operand or a store operand containing a virtual address requiring address translation, and address translating the virtual address by accessing a PTE for a virtual page containing a location of data to be obtained for a fetch operand or a location for storing data for a store operand;
   testing the security field (F) in the PTE to determine if a prior-data state exists for a virtual page being accessed by a fetch operand or a partial-page-store operand; and
   accessing predetermined form data for the fetch operand if the security field (F) indicates a prior-data state exists for the virtual page without providing any page fault signal, regardless of the setting of any backing page frame indicator in the PTE.

2. A method of obtaining security of data contents of page frames in a storage of a computer system as defined in claim 1, further comprising the step of:
   generating the predetermined form data by replicating one or more predetermined characters to provide data for the fetch operand.

3. A method of obtaining security of data contents of page frames in a storage of a computer system as defined in claim 1, further comprising the step of:
   structuring the predetermined form data in a page frame in the computer system for being accessed by a page displacement location (D) in a virtual address.

4. A method of obtaining security of data contents of page frames in a storage of a computer system as defined in claim 1, further comprising the steps of:
   structuring multiple page frames to contain predetermined form data to provide multiple form page frames in the computer system;
   providing a form address field (F#) in each PTE to assign one of the multiple form page frames to a respective PTE; and
   accessing predetermined form data at a page displacement location (D) of a virtual address in one of the multiple form page frames located by content of the form address field in the PTE to provide the data for a fetch operand when the prior-data security field (F) in the PTE is set to the prior-data state.

5. A method of obtaining security of data contents of page frames in a storage of a computer system as defined in claim 4, further comprising the steps of:
   storing a form page frame index table at a predetermined table address, the index table having entries containing real storage addresses for locating the multiple form page frames; and
   writing in the form address field (F#) of each PTE the index number in the form page frame index table for a selected one of the multiple form page frames to be used for accesses to a virtual page of a PTE.

6. A method of obtaining security of data contents of page frames in a storage of a computer system as defined in claim 4, comprising the steps of:
   generating a fault indication when no addressable PTE is found for a processor virtual address translation for a fetch request;
   allocating a page table comprising one or more PTEs; and
   setting all PTEs in the page table to indicate a no backing page frame state, and to indicate a prior-data state for requiring use of default form means for a fetch request.

7. A method of obtaining security of data contents of page frames in a storage of a computer system as defined in claim 6, comprising the step of:
providing a default form page frame as the default form means.

8. A method of obtaining security of data contents of page frames in a storage of a computer system as defined in claim 6, comprising the step of:
providing a default form generating operation as the default form means.

9. A method of obtaining security of data contents of page frames in a storage of a computer system as defined in claim 1, the storing step further comprising:
testing the security field (F) in the PTE to determine if a prior-data state is indicated for a virtual page being accessed by a store operand, and if no prior-data state is indicated by the security field then completing the store access in a conventional manner.

10. A method of obtaining security of data contents of page frames in a storage of a computer system as defined in claim 1, the storing step further comprising:
testing the security field (F) in a PTE to determine if a prior-data state is indicated for a virtual page being accessed by a store operand, and if a prior-data state is indicated by the security field then testing the store operand to determine if the virtual page is to be entirely stored or partially stored by data being accessed for the store operand; and
detecting the PTE of the virtual page for an indication of a prior-assigned backing page frame, and if no backing page frame is indicated generating a page fault signal to obtain an assignment of a backing page frame and setting the PTE to indicate and address the backing page frame.

11. A method of obtaining security of data contents of page frames in a storage of a computer system upon the assignment of a page frame as defined in claim 10, further comprising the steps of:
copying an entire page frame from another storage location into an assigned backing page frame when the testing step indicates the virtual page is to be entirely stored, the copying step satisfying a requirement for prior-data security of the assigned backing page frame; and
setting the security field (F) in the PTE to indicate no prior-data state exists thereafter for the virtual page.

12. A method of obtaining security of data contents of page frames in a storage of a computer system upon the reassignment of a page frame as defined in claim 11, the copying step further comprising:
copying the content of a storage location in one storage medium to another page frame in a different storage medium.

13. A method of obtaining security of data contents of page frames in a storage of a computer system upon the assignment of a page frame as defined in claim 10, further comprising the steps of:
copying into the page frame a predetermined form page frame indicated in the page table entry (PTE) for satisfying a requirement for prior-data security when the testing step indicates a virtual page is to be partially stored; and then
performing a partial store into the page frame at a page displacement location (D) of the virtual address of the store operand.

14. A method of obtaining security of data contents of page frames in a storage of a computer system, comprising the steps of:
requesting an allocation of virtual pages by a user of the computer system;
providing parameters to an operating system (OS) by the user, the parameters comprising an address space identifier, a newform page frame containing a backing form content, a number of virtual pages being requested, and a virtual address origin for locating a contiguous sequence of the requested virtual pages;
generating a table of page table entries (PTEs) containing a number of PTEs equal to the number of virtual pages being requested for the sequence of virtual pages located at the requested virtual address origin;
comparing the backing form content of the newform page frame to each form page frame (form PF) in the OS set of form PFs;
inserting into the OS set a representation of an additional form PF equal to the newform page frame if no form PF is found by the comparing step to be equal to the newform page frame, but not inserting any additional form PF into the OS set if an equal form PF is found in the OS set; and
diverting a pre-initialization fetch access of a virtual page to one of the form PFs in the OS set prior to a first storing in the virtual page when no backing page frame has been assigned to the virtual page to avoid any page fault signalling for the pre-initialization fetch access.

15. A method of obtaining security of data contents of page frames in a storage of a computer system as defined in claim 14, comprising the steps of:
detecting if the first storing in the backing PF is a partial store to less than the entire content of the backing PF; and
copying the form PF indicated in the PTE into the backing PF prior to performing the first storing if the detecting step detects a partial store, but not copying the form PF prior to the first storing if the detecting step detects the first storing is to the entire backing PF.

16. A method of obtaining security of data contents of page frames in a storage of a computer system as defined in claim 14, comprising the steps of:
providing an OS form table containing addresses for locating each existing form PF in the OS set of form PFs; and
generating an entry in the OS form table for any additional form PF generated in the OS set.

17. A method of obtaining security of data contents of page frames in a storage of a computer system as defined in claim 16, comprising the steps of:
validating in the OS form table an invalid entry, and loading into the entry an address for the additional form PF; and
setting in each PTE in the page table a form identifier for locating an entry in the OS form table addressing a form PF in the OS set equal to the new form page frame parameter.

18. A method of obtaining security of data contents of page frames in a storage of a computer system as defined in claim 14, comprising the step of:
setting in each PTE in the page table a form identifier for locating a form PF in the OS set equal to the newform page frame parameter to indicate a backing page frame state, setting a security field in the PTE to a prior data state, and setting a form address field in the PTE to indicate default form data is to be used for the processor request.

* * * * *